(12) United States Patent
Takahashi

(10) Patent No.: US 8,930,659 B2
(45) Date of Patent: Jan. 6, 2015

(54) COMPUTER SYSTEM, MEMORY MANAGEMENT METHOD AND PROGRAM THEREOF

(75) Inventor: Masahiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1760 days.

(21) Appl. No.: 11/909,883

(22) PCT Filed: Mar. 30, 2006

(86) PCT No.: PCT/JP2006/307274
§ 371 (c)(1),
(2), (4) Date: Feb. 5, 2009

(87) PCT Pub. No.: WO2006/107095
PCT Pub. Date: Oct. 12, 2006

(65) Prior Publication Data
US 2009/0158000 A1 Jun. 18, 2009

(30) Foreign Application Priority Data
Mar. 31, 2005 (JP) .................................. 2005-104932

(51) Int. Cl.
*G06F 12/12* (2006.01)
*G06F 12/08* (2006.01)
*G06F 9/445* (2006.01)
*G06F 12/02* (2006.01)

(52) U.S. Cl.
CPC ................ *G06F 12/08* (2013.01); *G06F 9/445* (2013.01); *G06F 12/0292* (2013.01); *G06F 12/0238* (2013.01); *G06F 2212/2022* (2013.01); *G06F 2212/401* (2013.01)
USPC ..... 711/165; 711/103; 711/202; 711/E12.058

(58) Field of Classification Search
USPC ......................................... 711/103, 202, 165
See application file for complete search history.

(56) References Cited

U.S. PATENT DOCUMENTS 6,496,882 B2    12/2002  Iverson
2002/0049871 A1*  4/2002  Iverson ........................... 710/68
(Continued)

FOREIGN PATENT DOCUMENTS

JP     4-284551 A     10/1992
JP     5-324476 A     12/1993
(Continued)

OTHER PUBLICATIONS

Keun Soo Yim et al., "A Flash Compression Layer for SmartMedia Card Systems," IEEE Transactions on Consumer Electronics, Feb. 1, 2004, pp. 192-197, vol. 50 No. 1, IEEE Service Center, New York, USA.

(Continued)

*Primary Examiner* — Kenneth Lo
(74) *Attorney, Agent, or Firm* — Sughrue Mion, PLLC

(57) ABSTRACT

A computer system, having a non-volatile storage unit (152), a main storage unit (151), and a data processor (102) including a memory management unit (102A) for managing a program stored in the non-volatile storage unit to transfer a program stored in the non-volatile storage unit to the main storage unit, wherein the memory management unit (102A) includes a program storage control function of storing a program subjected to predetermined data conversion and a program yet to be subjected to predetermined data conversion in the non-volatile storage unit, and a function of combining programs subjected to predetermined data conversion so as not to bridge over a boundary between blocks at the execution of the program storage control function, as well as, at a first access to a certain block, expanding all the data included in the block to a corresponding block of the main storage unit.

3 Claims, 16 Drawing Sheets

(56) References Cited

U.S. PATENT DOCUMENTS

| | | |
|---|---|---|
| 2004/0260919 A1 | 12/2004 | Takahashi |
| 2007/0043938 A1* | 2/2007 | May et al. .......... 713/2 |

FOREIGN PATENT DOCUMENTS

| | | |
|---|---|---|
| JP | 8-235329 A | 9/1996 |
| JP | 2001-92671 A | 4/2001 |
| JP | 2001-166945 A | 6/2001 |
| JP | 2002-278781 A | 9/2002 |
| JP | 2002-318696 A | 10/2002 |
| JP | 2005-10897 A | 1/2005 |
| JP | 2005-18418 A | 1/2005 |
| WO | 2005/013125 A1 | 2/2005 |

OTHER PUBLICATIONS

Keun Soo Yim et al., "A Flash Compression Layer for SmartMedia Card Systems," IEEE Transactions on Consumer Electronics, Feb. 1, 2004, pp. 192-197, vol. 50, No. 1, ISSN 0098-3063, INSPEC Accession Number: 7943192; Digital Object Identifier: 10.1109/TCE.2004.1277861, IEEE Service Center, New York, USA.

* cited by examiner

FIG. 9
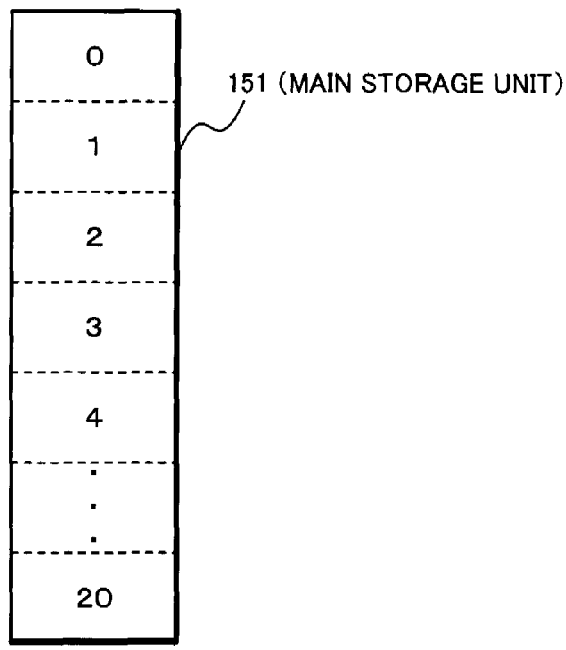
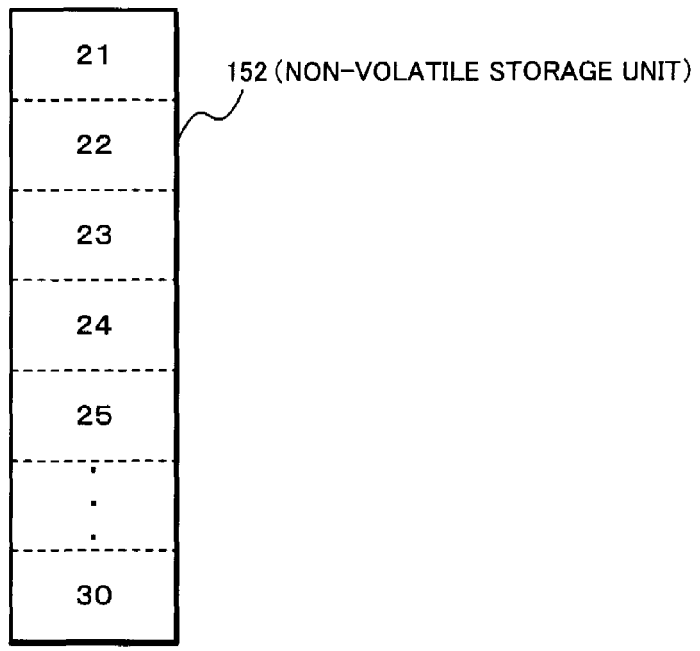

FIG. 10

| LOGICAL BLOCK ADDRESS | PROTECTION ATTRIBUTE |
|---|---|
| 0 | R |
| 1 | R |
| 2 | R |
| 3 | RW |
| 4 | RW |
| 5 | RW |
| 6 | RW |

(BEFORE MAPPING TABLE CHANGE)

| LOGICAL BLOCK ADDRESS | PHYSICAL BLOCK ADDRESS | PROTECTION MODE |
|---|---|---|
| 0 | 21 | R |
| 1 | 22 | R |
| 2 | 23 | NULL |
| 3 | 24 | NULL |
| 4 | 23 | NULL |
| 5 | 25 | NULL |
| 6 | 24 | NULL |

~ 110

(b)

(AFTER MAPPING TABLE CHANGE)

| LOGICAL BLOCK ADDRESS | PHYSICAL BLOCK ADDRESS | PROTECTION MODE |
|---|---|---|
| 0 | 21 | R |
| 1 | 22 | R |
| 2 | 23 | R |
| 3 | 24 | NULL |
| 4 | 23 | RW |
| 5 | 25 | NULL |
| 6 | 24 | NULL |

(BEFORE MAPPING TABLE CHANGE)

| LOGICAL BLOCK ADDRESS | PHYSICAL BLOCK ADDRESS | PROTECTION MODE |
|---|---|---|
| 0 | 21 | R |
| 1 | 22 | R |
| 2 | 13 | R |
| 3 | 15 | RW |
| 4 | 14 | RW |
| 5 | 25 | NULL |
| 6 | 16 | RW |

~ 110

(b)

(AFTER MAPPING TABLE CHANGE)

| LOGICAL BLOCK ADDRESS | PHYSICAL BLOCK ADDRESS | PROTECTION MODE |
|---|---|---|
| 0 | 21 | R |
| 1 | 22 | R |
| 2 | 13 | R |
| 3 | 15 | NULL |
| 4 | 15 | NULL |
| 5 | 25 | NULL |
| 6 | 16 | RW |

~ 110

COMPUTER SYSTEM, MEMORY MANAGEMENT METHOD AND PROGRAM THEREOF

TECHNICAL FIELD

The present invention relates to a computer system, a memory management method and a program thereof and, more particularly, to a computer system, a memory management method and a program thereof which enable management of data compressed, enciphered and then stored in a non-volatile storage medium such as ROM to realize efficient transfer to a main storage unit such as RAM.

BACKGROUND ART

Control program for starting a computer is stored in a non-volatile storage medium such as ROM whose capacity is large but whose access rate is low. It is a practice in related art to transfer a control program from, for example, ROM as a non-volatile storage medium to RAM as a main storage unit after system reset (initialization operation) is completed. Therefore, after a user applies power, he/she has to wait for long before using an information processor.

As described above, a main storage image is large. For reducing a starting time, therefore, it is necessary to save a capacity of a non-volatile storage medium such as ROM and for meeting such a requirement, an attempt is made to compress a main storage image (a control program for OS) and preserve the obtained image. In a compression-compatible starting system disclosed, for example, in Literature 1 (U.S. Pat. No. 6,496,882), for reducing a capacity of a non-volatile storage medium such as ROM, a main storage image necessary immediately after start-up is compressed on a logical block basis and at a first access to a certain logical block, compressed data corresponding to the logical block is read from the non-volatile storage medium, decompressed and expanded onto RAM. An address of ROM in which each compressed block is preserved is written in a management table and when reading a compressed block from ROM, read from ROM is executed by using an address obtained with reference to the management table. In this case, a memory management device in a computer system manages a physical address of a main storage memory as sections having a predetermined width.

On the other hand, an address designated by an application program, which is called a logical address, is obtained by mapping blocks of a physical address as sections with a predetermined width and translating the same such that they seem to be logically in succession, and a translation table for which is managed by an operating system (OS). Entry in a translation table which is cached by MMU (Memory Management Unit) in CPU is called TLB (Translation Look-aside Buffer).

In the above-described related art (Literature 1), however, when reading a compressed block, although the block in a non-volatile storage medium includes two or more logical blocks of data, they are separately read in each exception processing, resulting in some times causing a problem that one block of a non-volatile storage medium such as ROM which is to be accessed on a block basis is read twice or more.

In addition, because converted data to be read is preserved bridging over two blocks on the non-volatile storage medium, when expanding data of a logical block, access on a block basis might read a plurality of blocks of the non-volatile storage medium such as ROM to involve a situation where two TLB entries are used, resulting in hindering high-speed start-up.

Thus, an exemplary object of the present invention is to provide a computer system, a memory management method of a computer system and a management program thereof which enable stored program and data which are compressed and enciphered in a non-volatile storage medium such as ROM to be efficiently transferred to/expanded onto a main storage unit such as RAM, thereby reducing a starting time of the computer system even in a case where the size of a physical block to be read is changed.

SUMMARY

The present invention adopts a method of, when storing a program converted by compression, encipherment and the like in a non-volatile storage unit, storing the program so as not to bridge over a boundary between blocks and when first accessing a certain block, expanding all the data included in the block onto a corresponding block of a main storage unit.

According to a first exemplary aspect of the invention, a computer system, having a non-volatile storage unit, a main storage unit, and a data processor including a memory management unit for managing a program stored in the non-volatile storage unit and the main storage unit to transfer a program stored in the non-volatile storage unit to the main storage unit, wherein the memory management unit includes a program storage control function of storing a program subjected to predetermined data conversion and a program yet to be subjected to predetermined data conversion in the non-volatile storage unit, and a function of combining programs subjected to predetermined data conversion so as not to bridge over a boundary between blocks at the execution of the program storage control function, as well as, at a first access to a certain block, expanding all the data included in the block to a corresponding block of the main storage unit.

According to a second exemplary aspect of the invention, a computer system, having a non-volatile storage unit, a main storage unit, and a data processor including a memory management unit for managing a program stored in the non-volatile storage unit and the main storage unit to transfer a program stored in the non-volatile storage unit to the main storage unit, wherein the memory management unit includes a program storage control function of storing the program subjected to predetermined data conversion and a program yet to be subjected to predetermined data conversion in the non-volatile storage unit, a program reverse conversion function, operable upon memory access of OS and an application after start-up of the entire system, of transferring a program stored in the non-volatile storage unit to the main storage unit to reversely convert the program, a physical address change function of changing a physical address of a program stored in the non-volatile storage unit to a physical address of the main storage unit, and a capacity assignment function of assigning a capacity of a plurality of logical blocks for expanding data in a block including one physical address of a predetermined capacity assigned to the program which is stored in the non-volatile storage unit.

According to a third exemplary aspect of the invention, a computer system, having a non-volatile storage unit, a main storage unit, and a data processor including a memory management unit for managing a program stored in the non-volatile storage unit and the main storage unit to transfer a program stored in the non-volatile storage unit to the main storage unit, wherein the memory management unit includes an address translation unit operable upon memory access from a program for translating a logical block address to a physical block address, a mapping table unit which holds information of the address translation unit, a protection information unit which holds original protection information of the logical block address, and a mapping table change unit which updates an entry of the mapping table unit upon occurrence of an exception.

According to a fourth exemplary aspect of the invention, a computer system, having a non-volatile storage unit, a main storage unit, and a data processor including a memory management unit for managing a program stored in the non-volatile storage unit and the main storage unit to transfer a program stored in the non-volatile storage unit to the main storage unit, wherein the memory management unit includes an address translation unit operable upon memory access from a program for translating a logical block address to a physical block address, a mapping table unit which holds information of the address translation unit, and a mapping table change unit which updates an entry of the mapping table unit upon occurrence of an exception, wherein the mapping table unit holds an original protect mode of each logical block in the converted data.

According to a fifth exemplary aspect of the invention, a memory management method of a computer system structured to transfer a program stored in a non-volatile storage unit to a main storage unit, includes a first step of storing the program subjected to predetermined data conversion and the program yet to be subjected to predetermined data conversion in the non-volatile storage unit, a second step, operable upon memory access of OS and an application program after start-up of the computer system, of transferring a program subjected to predetermined data conversion among the programs stored in the non-volatile storage unit to the main storage unit to execute reverse conversion to the predetermined data conversion, a third step of changing a physical address of the program stored in the non-volatile storage unit to a physical address of the main storage unit, and a fourth step of assigning a capacity of a plurality of logical blocks for expanding data in a block including one physical address of a predetermined capacity assigned to the program which is stored in the non-volatile storage unit.

As described in the foregoing, according to the present invention, access to the physical block occurs only once, which enables efficient memory management to effectively reduce a start-up time of the computer system.

BRIEF DESCRIPTION OF THE DRAWINGS

FIG. 9 is a diagram for use in explaining an example of a state of assignment of physical block addresses of a main storage unit and a non-volatile storage unit in FIG. 8;

FIG. 10 is a diagram for use in explaining an example of contents of a protection mode (a protection information unit) in FIG. 8;

FIG. 11 is a diagram showing an initial state and a state as of after change of the mapping table unit that OS disclosed in FIG. 1 has, with FIG. 11(a) as a diagram for use in explaining an initial state of the mapping table unit and FIG. 11(b) as a diagram for use in explaining a state as of after change of the mapping table unit;

FIG. 17 is a diagram for use in explaining a state of a mapping table unit as of before re-conversion processing and a state as of after conversion processing according to the fourth exemplary embodiment.

EXEMPLARY EMBODIMENT

In the following, exemplary embodiments of the present invention will be described with reference to the accompanying drawings.

First Exemplary Embodiment

Figure 1:
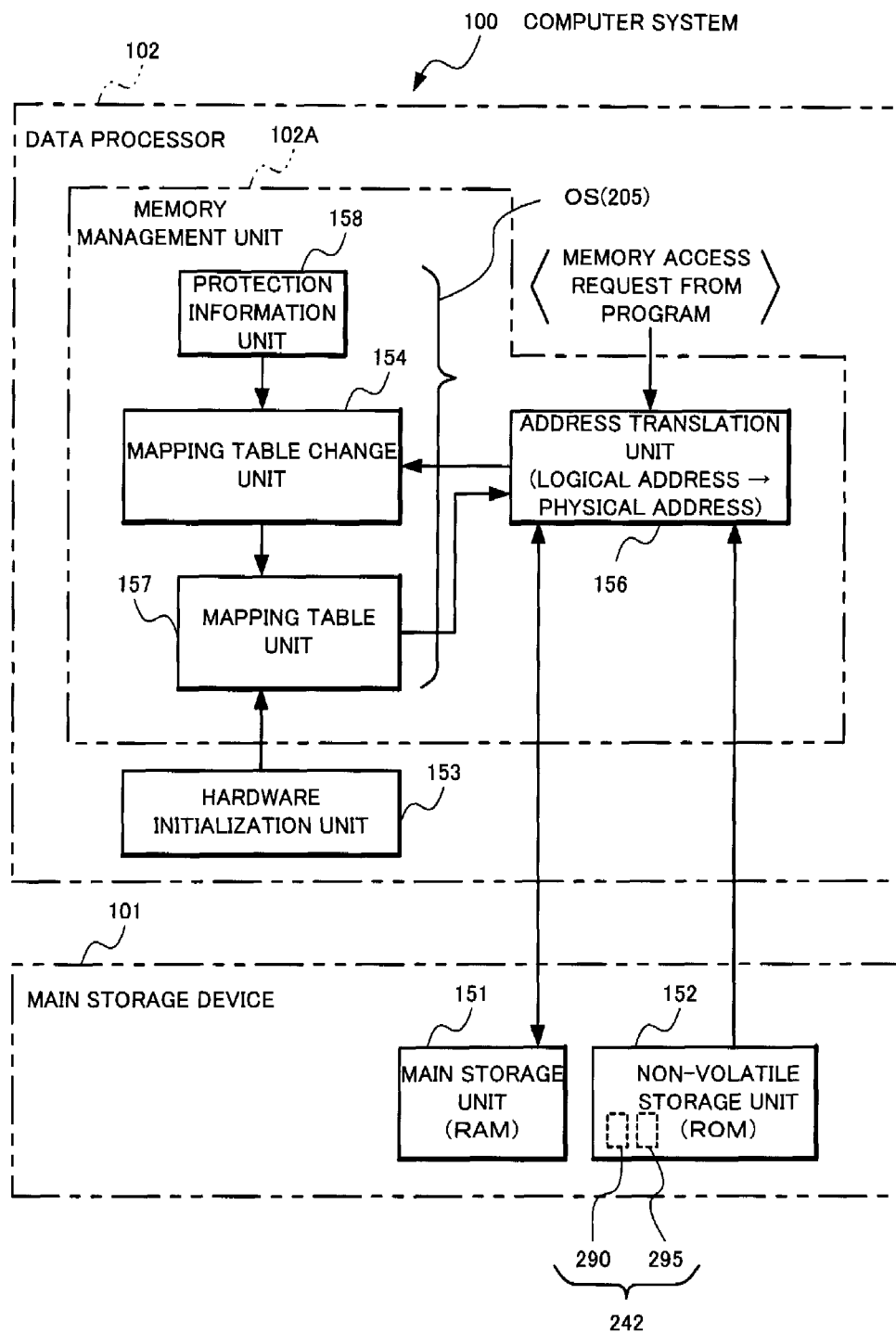
FIG. 1 is a block diagram showing a first exemplary embodiment of the present invention.

As shown in FIG. 1, a computer system 100 according to the present exemplary embodiment has a main storage device 101 and a data processor 102 and is operable under program control. The computer system 100 is a system for expanding (by decompression or releasing of encipherment) compressed or enciphered data of a non-volatile storage unit 152 (originally provided in the main storage device 101) onto a main storage unit 151 of the above-described main storage device 101 through the data processor 102.

More specifically, the above-described computer system 100 comprises the non-volatile storage unit 152 such as ROM which stores a program, the main storage unit 151 such as RAM which receives a program from the non-volatile storage unit 152, and the data processor 102 including a memory management unit (OS) 102A which manages a program stored in the above-described non-volatile storage unit 152 and main storage unit 151.

The memory management unit 102A comprises a program storage control function of storing a program subjected to predetermined data conversion and a program yet to be subjected to predetermined data conversion in the non-volatile storage unit 152. The memory management unit 102A further comprises a function of combining programs subjected to predetermined data conversion so as not to bridge over a boundary between blocks at the execution of the above-described program storage control function, as well as a function of expanding, at a first access to a certain block, all the data included in the block onto a corresponding block in the main storage unit 151.

The above-described memory management unit 102A functionally comprises a program storage control function of storing a program subjected to predetermined data conversion and a program yet to be subjected to predetermined data conversion in the non-volatile storage unit 152, a program reverse conversion function, which is operable upon memory access of the OS or an application after start-up of the entire system, of transferring a program subjected to predetermined data conversion which is stored in the above-described non-volatile storage unit 152 to the above-described main storage unit 151 and reversely converting the same, a physical address change function of changing a physical address of a program stored in the non-volatile storage unit 152 to a physical address of the main storage unit 151, and a capacity assignment function of assigning a capacity of a plurality of logical addresses of said program to one physical address of a predetermined capacity which is assigned to said program and is stored in the above-described non-volatile storage unit 152 at predetermined timing.

Thus, the non-volatile storage unit 152 is capable of storing image data obtained by subjecting a part of a main storage image as of after initialization processing of an OS 205 and an application program to data conversion on a block basis, so that converted data of each block can be appropriately combined so as not to exceed a block size. With this arrangement, at the start-up of the entire computer system, the system is started from a main storage image part yet to be subjected to data conversion to enter the same state as that of immediately after the start-up of the OS 205 and the application program, so that the system returns to the environment as of immediately after the start-up. At this time, since the system is started from a main storage image part, no operation interruption will occur before the system goes operable to efficiently reduce a system start-up time.

Moreover, according to the present invention, the above-described memory management unit 102A comprises an address translation unit 156 operable upon memory access from a program to translate a logical block address into a physical block address, a mapping table unit 157 for holding information of the address translation unit 156, a protection information unit 158 for holding original protection information of the above-described logical block address and a mapping table change unit 154 for changing an entry of said mapping table unit 157 upon occurrence of an exception.

Then, with such a structure, based on is that, when combining data converted by the above-described data conversion in the non-volatile storage unit 152, a combination is made so as not to bridge over a boundary between blocks as described above and at a first access to a certain block, all the data included in the block is expanded onto a corresponding block of the main storage.

More specifically, the computer system according to the present exemplary embodiment comprises at least the main storage unit 151, the non-volatile storage unit 152 and the data processor 102 as described above and furthermore, stored in said non-volatile storage unit 152 is data obtained by subjecting the above-described main storage image as of immediately after the system is started to data conversion processing on a predetermined width basis. Then, when an access to a main storage block yet to be obtained occurs after the start-up of the system, executed is operation of expanding data of at least one block included in a block of the non-volatile storage unit 152 corresponding to the above-described main storage block yet to be obtained onto each corresponding block yet to be obtained on the above-described main storage unit 151, thereby bringing the block from a yet-to-be-obtained state to an obtained state.

In other words, with data obtained by subjecting a main storage image as of immediately after system start-up to data conversion processing on a predetermined width basis stored in the above-described non-volatile storage unit 152, the above-described address translation unit 156 comprises a function of, when an access to a main storage block yet to be obtained occurs after system start-up, responsively generating exception processing, and the above-described mapping table change unit 154 comprises a function of expanding data of at least one block included in a block of the non-volatile storage unit 152 corresponding to a main storage block yet to be obtained onto each corresponding block yet to be obtained on said main storage unit 151, thereby changing the block from being yet-to-be-obtained to being obtained. Contents thereof will be detailed when the mapping table change unit 154 and the address conversion unit 156 will be described later.

In addition, in the present exemplary embodiment, to a program which is stored in the above-described non-volatile storage unit 152 and which is subjected to predetermined data conversion, protection mode NULL is uniformly set, while to a program operable upon memory access of the OS and the application after system start-up and stored in the non-volatile storage unit which is subjected to predetermined data conversion, a physical address on the main storage unit is assigned. These contents will be detailed when the mapping table 157 will be described later.

Moreover, in the present exemplary embodiment, in each of a plurality of programs stored in a physical address of a predetermined size in the above-described non-volatile storage unit 152, a logical address, a total number of logical addresses and a program data size corresponding to a physical address of the main storage unit 151 are entered. Furthermore, the present exemplary embodiment is structured such that with a plurality of physical addresses of a predetermined data capacity of the above-described non-volatile storage as one unit, programs assigned to a plurality of logical addresses are accommodated. Contents thereof will be sequentially described later.

In the following, each component will be specifically described.

(Structure of the Main Storage Device)

The main storage device 101, as described above, comprises the main storage unit 151 and the non-volatile storage unit 152. Of them, the main storage unit 151 is a memory which stores a program for causing CPU to compute, for which DRAM, DDR-SDRAM and the like are appropriately used. The main storage unit 151 is a part forming a main storage region other than the non-volatile storage unit 152. The main storage unit 151 may be a readable/writable memory of arbitrary kind and used in general is a non-volatile memory such as MRAM (Magnetoresistive RAM), FeRAM (Ferroelectric RAM) or a flash memory in place of a volatile memory such as DRAM and SRAM.

The non-volatile storage unit 152 is a part for storing a main storage image as of after initialization processing of the OS and the application (hereinafter referred to as "immediately after start-up image"). The non-volatile storage unit 152 may be a non-volatile memory of arbitrary kind, for which usable is, for example, a read-only non-volatile memory such as ROM and a rewritable non-volatile memory such as MRAM, FeRAM or a flash memory. Possible methods of changing the contents of an immediately after start-up image (main storage image) is, when the non-volatile storage unit 152 is replaceable or when the non-volatile storage unit 152 is rewritable, downloading an image file by using a network or reading an image file from an external storage medium.

(Program Data Format in the Main Storage Device 101)

Figure 2:
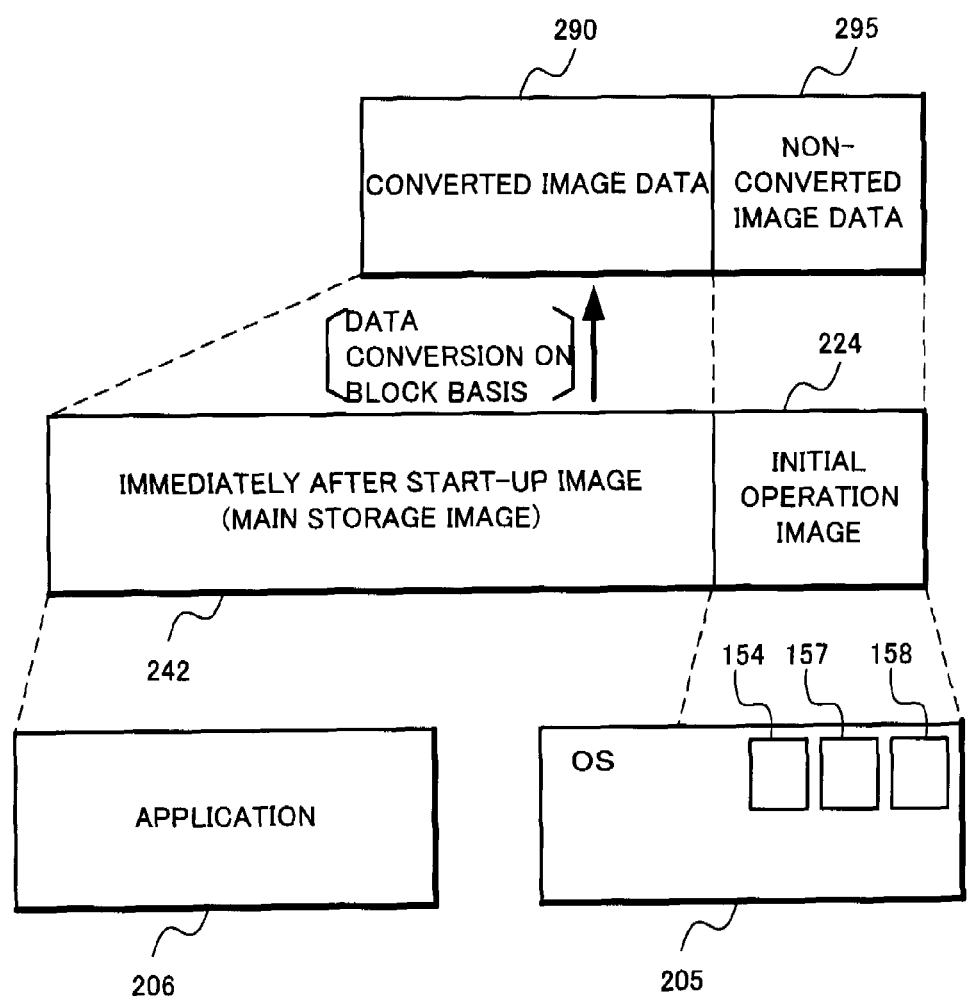
FIG. 2 is a block diagram showing converted image data and data yet to be converted which are preserved virtually separated from each other in a non-volatile storage unit, which illustrates an example of data conversion of an image as of immediately after start-up on a logical block basis according to the first exemplary embodiment.

FIG. 2 shows an example of data conversion of the above-described immediately after start-up image 242 (the main storage image: main image as of after initialization of the OS and the application is completed) onto the non-volatile storage unit 152 such as ROM on a logical block basis.

A method of generating the immediately after start-up image (main storage image) 242 is an arbitrary, which can be generated, for example, by dumping a main storage image from the main storage unit 151 as of immediately after start-up by an ordinary system starting method. A part of the immediately after start-up image 242 (main storage image) is stored in the non-volatile storage unit 152 after converted into data on a logical block basis.

In the non-volatile storage unit 152 such as ROM, a control program for OS is held virtually divided into two regions, converted image data 290 and non-converted image data 295. Of the two, the converted image data 290 is a result obtained by subjecting the immediately after start-up image 242 which is sectioned on a logical block basis to specific data conversion processing and putting the resultant data together. Among examples of data conversion processing are compression and encipherment. Data subjected to conversion processing can be restored to original data by reverse conversion, which reverse conversion will be referred to as "expansion". The above-described converted image data 290, as will be described later, is dynamically expanded onto the main storage unit 151 after start-up and used for the execution of an application 206. Part of the converted image data 290 is used for operating the OS 205.

Figure 3:
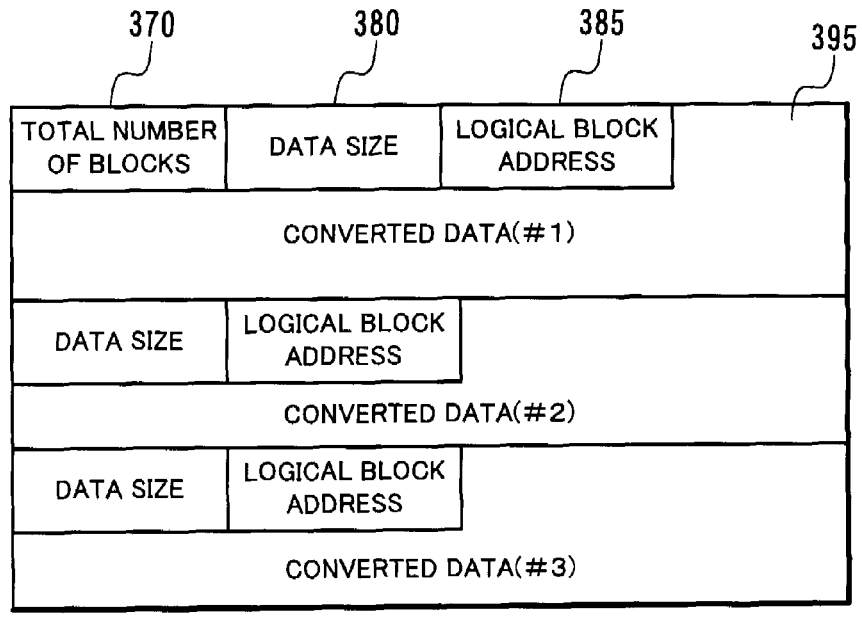
FIG. 3 is a block diagram showing each physical block of converted image data, which illustrates a data format obtained after converting data of a plurality of blocks according to the first exemplary embodiment.

FIG. 3 shows an example of a data format on the non-volatile storage unit (ROM) 152 obtained after data of a plurality of blocks on the main storage unit 151 is converted. Here, a total number of blocks 370 represents the number of logical blocks included in a relevant block subjected to data conversion. A data size 380 holds a data size as of after conversion of the relevant logical block. A logical block address 385 represents a logical block number to be expanded. Converted data 395 is data subjected to data conversion. Thus, a plurality of logical blocks hold a series of contents, a data size, a logical block address and converted data, which are included in one block of the ROM (non-volatile storage unit) 152.

For here putting image data subjected to conversion processing on a block basis on the main storage unit 151 together, related techniques adopt a method of successively putting data together in the order of logical block addresses. On the other hand, in the present exemplary embodiment, an arbitrary combination is selected so as not to exceed a physical block size while considering a size of converted data. At this time, it is possible to put blocks not successive in terms of a logical block address into one block on the non-volatile storage unit 152.

Figure 12:
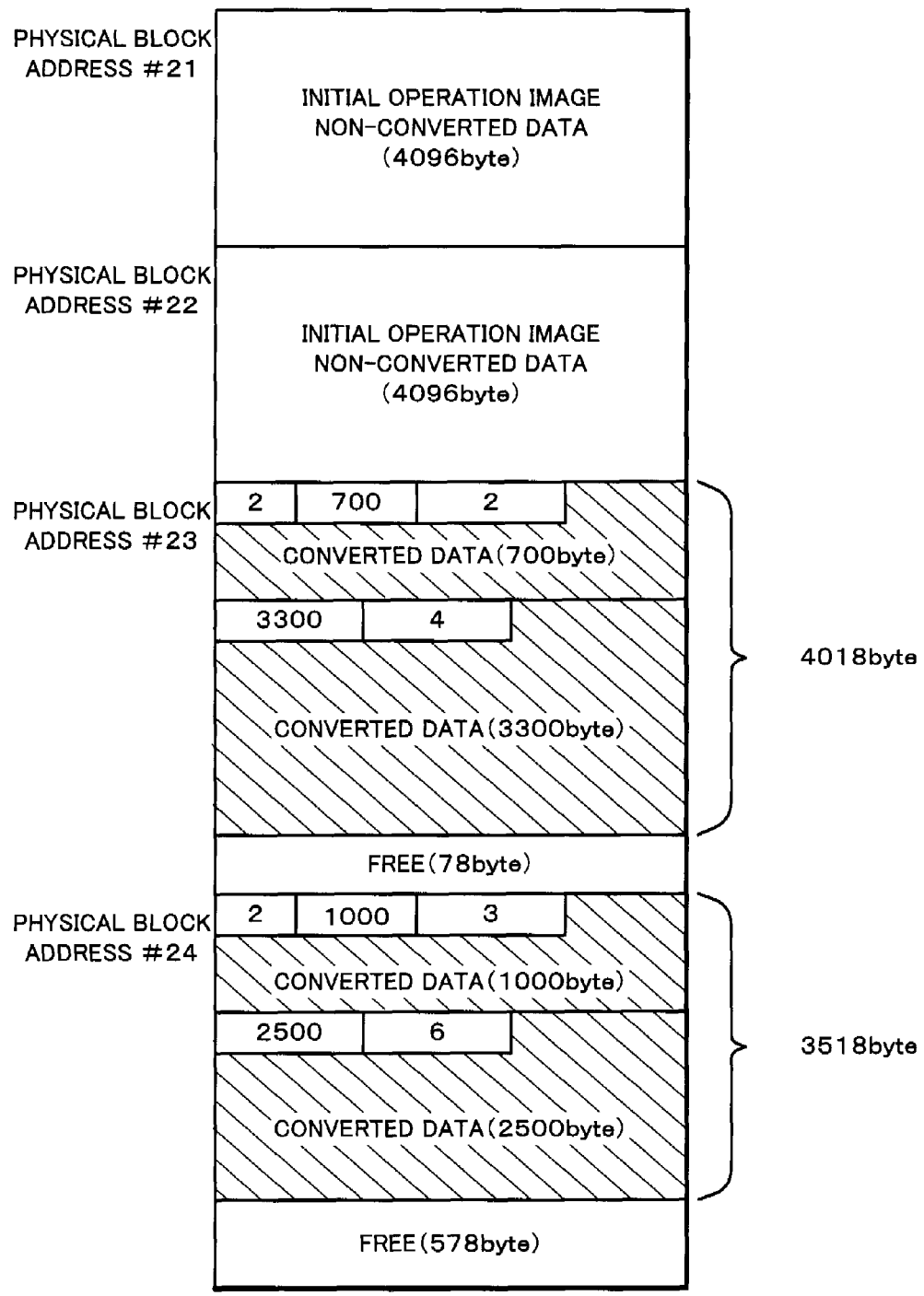
FIG. 12 is a diagram for use in explaining an example of arrangement of non-converted data (initial operation image) and converted data of the non-volatile storage unit shown in FIG. 8.

In a physical block address 23 shown in FIG. 9 which will be described later, for example, logical block addresses "2" and "4", blocks not successive, are combined as shown in FIG. 12 which will be described later. In FIG. 12, "2/700/2" represents "total number of blocks/data size/logical bock address" (see FIG. 3) and "3300/4" represents "data size/logical block address" (see FIG. 3).

Again with reference to FIG. 2, the above-described non-converted image data 295 is a part yet to be subjected to data conversion among the immediately after start-up image (main storage image) 242, which part is used to start the computer system at the start-up. The non-converted image data 295 is accordingly initial operation image 224.

(Structure of the Data Processor 102)

As shown in FIG. 1, the data processor 102 comprises the memory management unit (OS) 102A for managing programs stored in the above-described non-volatile storage unit 152 and main storage unit 151.

More specifically, the memory management unit 102A comprises the address translation unit 156 operable upon memory access from a program for translating a logical block address into a physical block address, the mapping table unit 157 for holding information of the address translation unit 156, the protection information unit 158 for holding original protection information of said logical block address and the mapping table change unit for updating an entry of said mapping table unit 157 when an exception occurs. The data processor 102 comprises a hardware initialization unit 153 as shown in FIG. 1 and functions to execute initialization of hardware of each part of the computer system 100 when the system starts.

(The Mapping Table Unit 157)

Again with reference to FIG. 1, the mapping table unit 157 is a control table which stores information for translating a memory address (logical address) designated by OS or an application program (which are generically named as a program) operating on the computer system 100 when operating the main storage device 101 into a memory address (physical address) actually assigned to the main storage device 101, and a protect mode. Here, a logical address is formed of a logical block address and in-block address and a physical address is formed of a physical block address and an in-block address.

Figure 4:
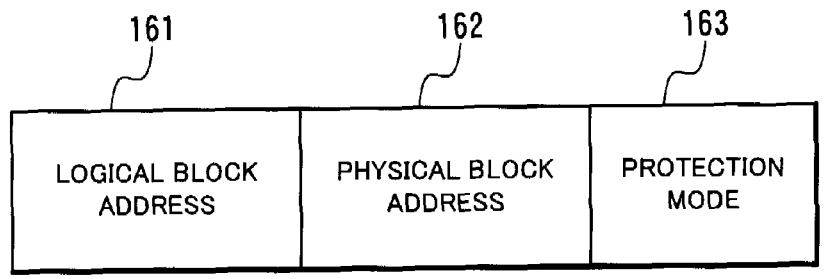
FIG. 4 is a diagram for use in explaining an example of arrangement of an entry of a mapping table unit that a computer comprises according to the first exemplary embodiment.

FIG. 4 shows an example of arrangement of an entry in the above-described mapping table unit 157. The mapping table unit 157 is formed of a set of such entries as shown in FIG. 4. Then, as illustrated in FIG. 4, held in one entry is a combination of a logical block address 161, a physical block address 162 and a protect mode 163 (representing a protection mode, which is also the case hereinafter).

Here, the logical block address 161 is an address for unitarily identifying an individual logical block which is obtained by dividing a logical address space into blocks of a predetermined size. The physical block address 162 is an address for unitarily identifying an individual physical block which is obtained by dividing a physical address space into blocks of the same size as that of logical address space. Although using a unit called page inherent to architecture enables efficient processing of a block, the present invention is not limited to such a unit.

Moreover, the protect mode (protection mode) 163 takes any value of a read-only protect mode, readable/writable protect mode (protection mode) and a protect mode (protection mode) of NULL (no assignment). The protect mode (protection mode) 163 is pseudo different from an original protection attribute of a program executed on the computer system 100 and as to a block of converted image data of ROM (non-volatile storage unit 152), the protect mode of NULL (no assignment) is uniformly set at system start-up.

More specifically, the protect mode (protection mode) 163 of NULL indicates that to a logical block determined by the logical block address 161 of the entry, no physical memory block is assigned yet. The protect mode 163 being read-only or readable/writable indicates that to a logical block determined by the logical block address 161 of the entry, a physical block determined by the physical block address 162 of the entry is already assigned and that a protect mode of the block is read-only or readable/writable.

Accordingly, a physical block address column has the following two representations. First, it represents a block address (when the protect mode is NULL) on the non-volatile storage unit 152 on which converted data exists and secondly, represents a block address (when the protect mode is not NULL) of a physical memory actually assigned to the main storage device 101. Here, in place of designation of NULL in the protect mode 163, an existence bit or the like can be used. Existence bit is a bit indicating whether a physical block belonging to a relevant entry exists or not. In this case, the protection information unit 158 (FIG. 1) which will be described later needs not to exist and the protect mode 163 holds an original block attribute. Occurrence/non-occurrence of an exception event which will be described later is determined with respect to 0/1 of the existence bit.

(The Protection Information Unit 158)

Figure 5:
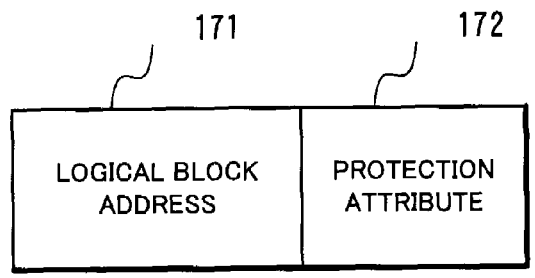
FIG. 5 is a diagram for use in explaining an example of arrangement of an entry of a protection information unit that the computer comprises according to the first exemplary embodiment.

Again refer to FIG. 1. In FIG. 1, the above-described protection information unit 158 is a control table for holding a protection attribute of a program to be executed on the computer system 100. FIG. 5 shows an example of arrangement of an entry of the protection information unit 158. As shown in FIG. 5, held in one entry is a pair of a logical block address 171 and a protection attribute 172. Of the two, the protection attribute 172 has a read-only protection attribute and a readable/writable protection attribute and which protection attribute is to be set depends on an original protection attribute of a block specified by the logical block address 171.

(The Address Translation Unit 156)

The address translation unit 156 has a function of translating a logical address designated by a program operating on the computer system 100 at the time of memory operation into a physical address and a function of detecting an exception caused by violation of a protect mode and activating exception processing. Translation from a logical address to a physical address and detection of an exception due to protection mode violation are executed mainly with reference to the mapping table unit 157.

(The Mapping Table Change Unit 154)

Again with reference to FIG. 1, the mapping table change unit 154 has a function of executing exception processing activated by the address translation unit 156. Executed in the exception processing are determination of an original protection attribute with reference to the protection information unit 158, read from a non-volatile storage medium, expansion and write to the main storage unit 151 and update of the mapping table unit 157.

Figure 6:
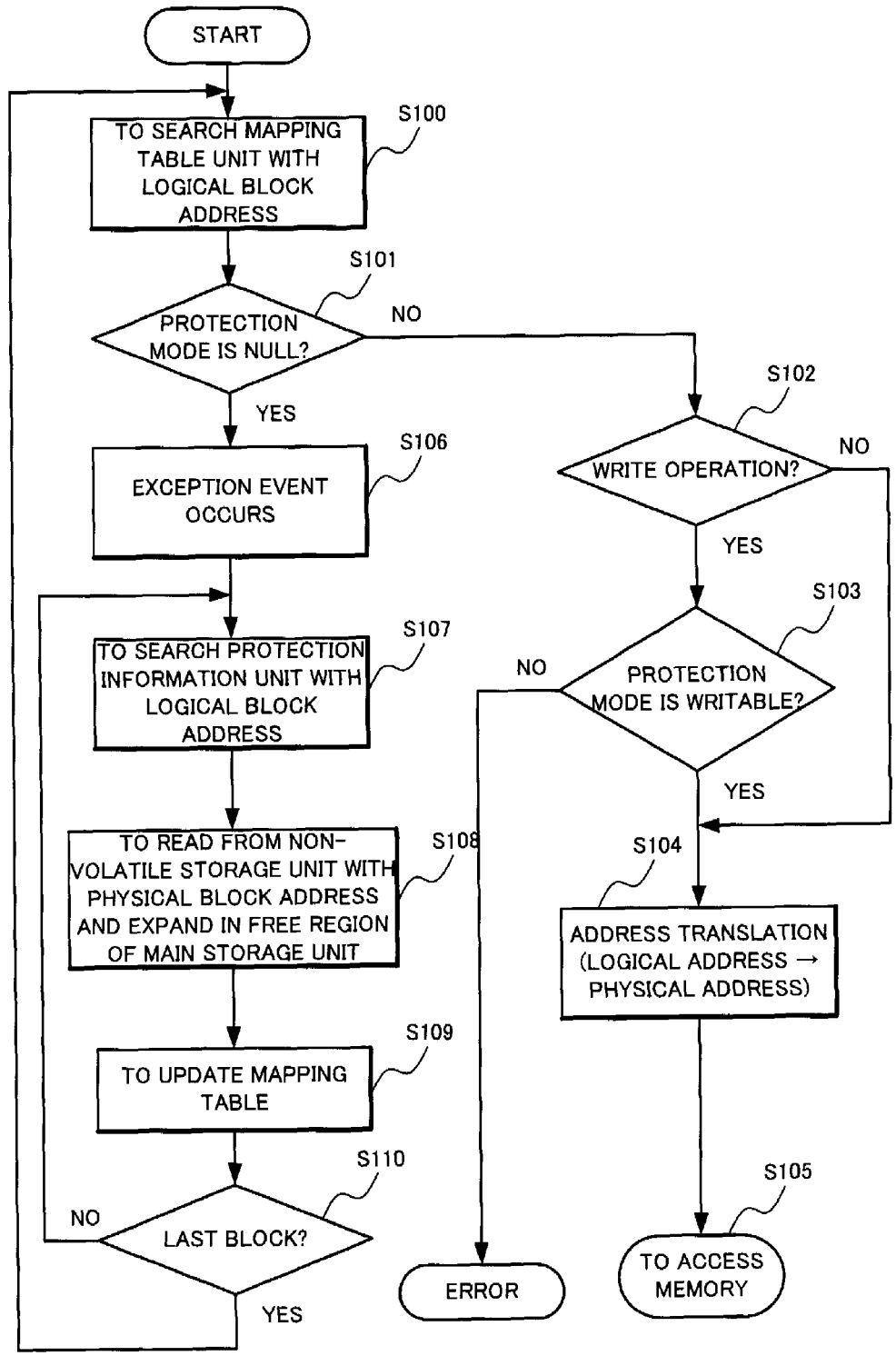
FIG. 6 is a flow chart showing an example of computation processing at an address translation unit and a mapping table change unit of the computer according to the first exemplary embodiment.

FIG. 6 is a flow chart showing one example of processing of the above-described address translation unit 156 and mapping table change unit 154. In the following, the processing will be detailed.

First, the address translation unit 156 searches the mapping table unit 157 with a block address in a logical address related to memory access designated by the program to obtain an entry which is coincident with the logical block address 161 shown in FIG. 4 (Step S100).

Next, the address translation unit 156 determines whether the protect mode 163 in the entry obtained at Step S100 is NULL, read-only or readable/writable (Step S101). When the protect mode is read-only or readable/writable (No at Step S101), check the mode of the access as a protect mode to confirm whether it is a proper access or not (Steps S102 and S103) and when it is an improper access, execute error processing 1 such as refusal of the memory access. On the other hand, when it is a proper access, the address translation unit 156 translates the logical address designated by the program into a physical address by using the physical block address 162 in the entry obtained at Step S100 (Step S104) and accesses a part of the main storage unit 151 specified by the physical address (Step S105).

When the protect mode 163 is NULL (Yes at Step S101), the address translation unit 156 temporarily holds processing of the relevant memory access and notifies the mapping table change unit 154 of an exception event to activate exception processing (Step S106). In the exception event, notify the mapping table change unit 154 of the physical block address 162 in the entry obtained at Step S100.

Subsequently to Step S106, the mapping table change unit 154 searches the protection information unit 158 with the logical block address 385 of a logical block obtained by reading a block of the non-volatile storage unit 152 specified by the physical block address 162 notified by the address translation unit 156 to obtain the protection attribute 172 of an entry with which the logical block address 171 of FIG. 5 coincides (Step S107).

Next, expand the converted data 395 and copy the data in a free block of the main storage unit 151 (Step S108). As techniques of here managing which block is free and which block is in use among blocks forming the main storage unit 151, well known arbitrary methods can be used such as management in a table which holds a state of use for each block of the main storage unit 151.

Moreover, the mapping table change unit 154 searches the mapping table unit 157 for an entry whose logical block address 161 shown in FIG. 4 is coincident with the logical block address 385, rewrites the physical block address 162 of the entry to a physical block address of a block of the main storage unit 151 to which copy is made at Step S109 and rewrites the protect mode 163 to an original protection mode (read-only or readable/writable) of the block (Step S109).

In the relevant block read from the non-volatile storage unit 152, converted data of as many logical blocks as the number described in the total number of blocks 370 is held. Accordingly, repeat such processing as many times as the number of the total number of blocks 370 as "search of the protection information unit 158 (FIG. 1), expansion of data, and assignment and write of a physical memory to update the mapping table" (Step S109). When repetition of the processing as many times as the number described in the total number of blocks 370 is completed (No at Step 110), notify the address translation unit 156 of the end of the exception processing. Upon receiving an exception processing end notification from the mapping table change unit 154, the address translation unit 156 resumes the temporarily held memory access processing from Step S100.

(Schematic Operation of the Computer System 100)

Figure 7:
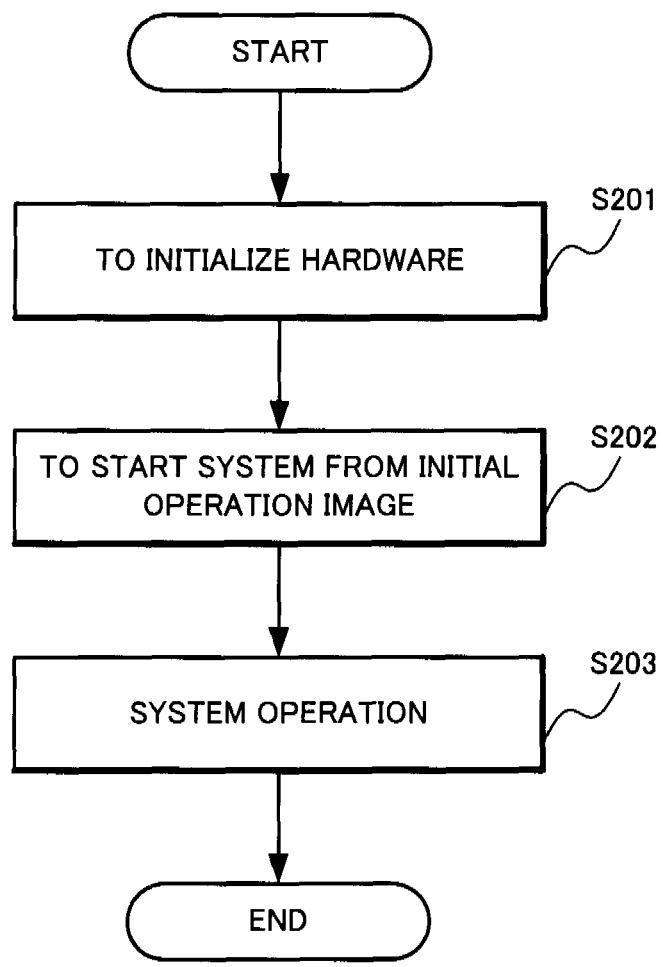
FIG. 7 is a flow chart showing schematic operation of the system according to the first exemplary embodiment.

FIG. 7 is a flow chart showing schematic operation of the computer system 100 according to the present exemplary embodiment. Here, schematic operation of the computer system 100 will be described with reference to FIG. 6 and FIG. 7.

Upon started, the computer system 100 according to the present exemplary embodiment first initializes hardware by the above-described hardware initialization unit 153 (Step S201). In a case of the present exemplary embodiment, the mapping table unit 157 and the protection information unit 158 are included in a non-converted part of the non-volatile storage medium in an initialized state.

At the initialized mapping table unit 157, in every entry shown in FIG. 4, the logical block address 161 and the physical block address 162 are already set and as to the protect mode 163, in an entry of a block belonging to the initial operation image 224 as non-converted image data, the mode is set to be an original protection attribute of the block (read-only or readable/writable) and in an entry of a block belonging to the immediately after start-up image 242 other than the initial operation image 224, it is set to be NULL. At the initialized protection information unit 158, the logical block address 171 and the protection attribute 172 are already set in every entry shown in FIG. 5.

Next, the computer system 100 is started up from the initial operation image 224 in a non-converted part of the non-volatile storage medium (Step S202). Since the initial operation image 224 is in the same state as that of the OS or the application program immediately after a start-up, the system will return to an environment as of immediately after the start-up. At this time, there exists none of operation interruption from the start-up from the initial operation image 224 until system operation is enabled (Step S203).

When an access first occurs from the program to a certain block at the stage of system operation (Step S203), since the block is mapped by the protect mode (protection mode) of NULL, the address translation unit 156 notifies an exception event to temporarily hold the access (S106 in FIG. 6). The mapping table change unit 154 having received the exception event refers to the protection information unit 158 to determine an attribute of a block of the accessed logical address (Step S107 of FIG. 6) and when it is a proper access, assigns a free block from the main storage unit 151, expands the contents of the relevant block in the non-volatile storage unit 152 and obtains data of the relevant block from the converted part of the non-volatile storage medium to write the contents to the main storage unit 151 (Step S108 in FIG. 6). Moreover, the mapping table change unit 154 sets the mapping table unit 157 such that the logical block address to which the access has been made is mapped by the protect mode of the original protection attribute.

When the relevant physical block includes converted data of a plurality of logical blocks, after expanding each data by the same procedure, resume the temporarily held access processing from Step S100 of FIG. 7. As a result, the temporarily held access and the following access to the relevant block are executed to an assigned main storage block. At this time, reducing a unit of a block leads to reduction in an expanding time, thereby enabling a time when system operation is interrupted to be shortened.

(Start-Up of the Computer System 100: the Initial Operation Image 224)

Next, the initial operation image 224 will be further detailed. In the present exemplary embodiment, the computer system 100 is started by using only the initial operation image 224. Accordingly, the initial operation image 224 should include a minimum required OS program for starting the computer system 100. To the contrary, a program or an application program for realizing an additional function of OS, without which the system can be started up with no problem, needs not to be included in the initial operation image 224.

As is clear from the foregoing description, when there exists on the computer system 100 no program and data for realizing the processing of FIG. 6 (processing at the address translation unit 156 and the mapping table change unit 154), no processing will work after system start-up. Accordingly, a part of an exception processing handler of OS including the mapping table change unit 154, a device driver for hardware management, the mapping table unit 157 and the protection information unit 158 should be at least included in the initial operation image 224 yet to be converted.

Thus, the present first exemplary embodiment has the effects that read from a certain physical block occurs only once and that there is no need of reading two or more physical blocks at the time of expansion.

(Specific Example of the Computer System 100)

Figure 8:
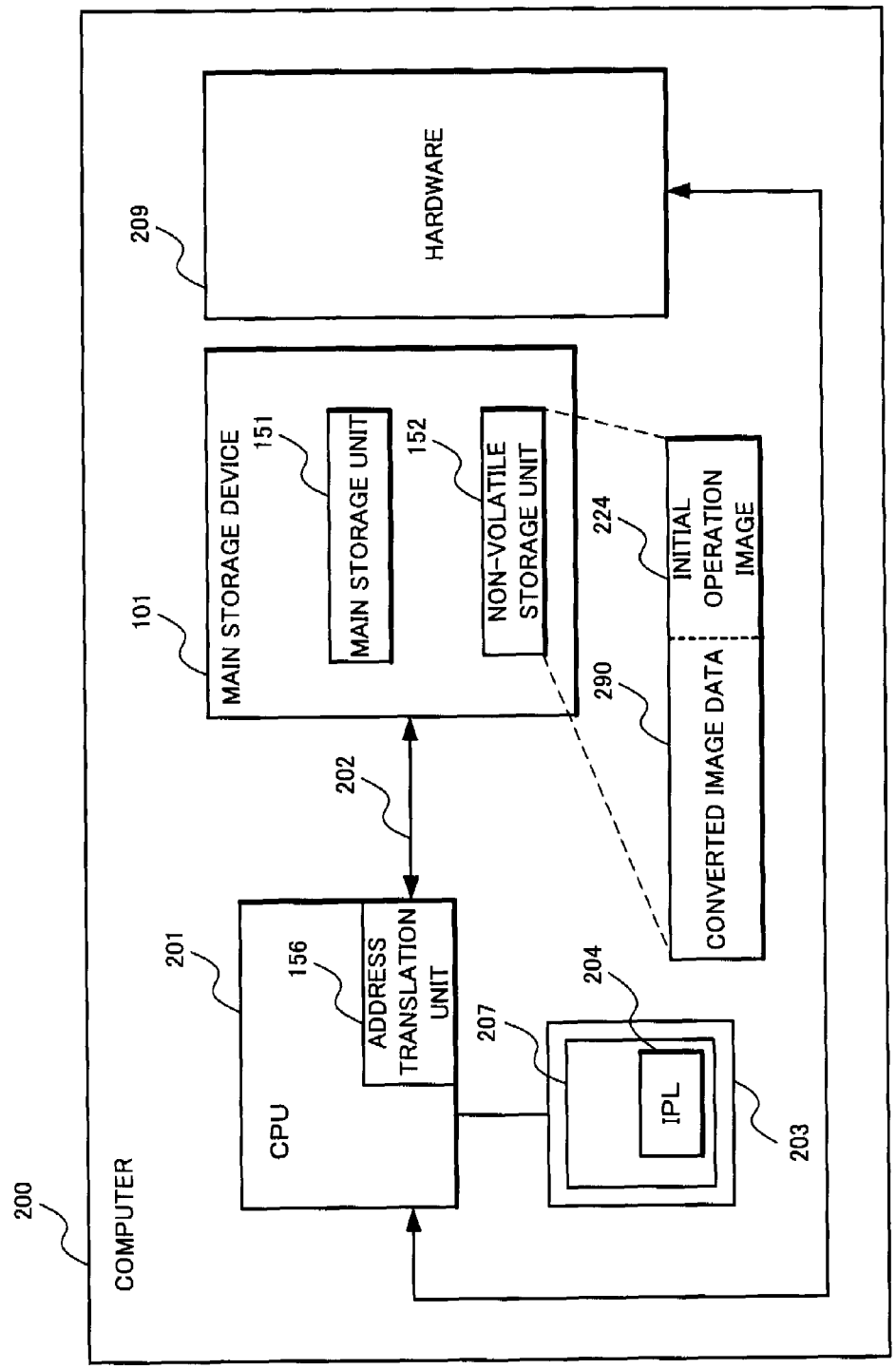
FIG. 8 is a block diagram showing a specific example of the first exemplary embodiment.

FIG. 8 shows a specific example (a computer system 200) of the computer system 100 according to the present first exemplary embodiment.

In the non-volatile storage unit 152, the converted image data 290 (see FIG. 2) and the initial operation image 224 yet to be converted into data (see FIG. 2) are stored in advance. The initial operation image 224 includes the mapping table unit 157 and the protection information unit 158 in the initial state and includes the mapping table unit 154 as one function of the OS 205 which are shown in FIG. 1.

The main storage device 101 formed of the main storage unit 151 and the non-volatile storage unit 152 is connected to a CPU 201 through a memory bus 202, and the address translation unit 156 is contained in the CPU 201. To the CPU 201, other hardware 209 and a storage device 203 are connected and in the storage device 203, a BIOS 207 is provided. In the BIOS 207, an IPL 204 is contained.

FIG. 9 shows an example of assignment of physical block addresses to the main storage device 101. While numbers of blocks are assigned to physical block addresses in practice, the illustrated example has an extremely small number of blocks for facilitating understanding of the present invention. To the main storage unit 151, physical block addresses 0~20 are assigned and to the non-volatile storage unit 152, physical block addresses 21~30 are assigned.

FIG. 10 shows an example of contents of the protection information unit 158 that the OS 205 has. While the protection information unit 158 in FIG. 10 is disclosed to have a small number of blocks, there exist numbers of blocks in practice. In FIG. 10, a protection attribute of each block of logical block addresses 0~2 is read-only (R) and a protection attribute of each block of logical block addresses 3~6 is readable and writable. FIGS. 11(*a*) and 11(*b*) show examples of the mapping table unit 157 as of before and after the change of the mapping table, respectively.

(Initial State of the Mapping Table Unit 157)

FIG. 11(*a*) shows an example of the mapping table unit 157 that the OS 205 has in an initial state. While the mapping table unit 157 shown in FIG. 11(*a*) is disclosed to have a small number of blocks, there exist a large number of blocks in practice. As shown in FIG. 11(*a*), in the initial state of the mapping table unit 157, with the logical block addresses 0~6, the physical block addresses 21~25 (FIG. 9) of the non-volatile storage unit 152 are correlated. Of the five physical blocks with the physical block addresses 21~25 (FIG. 9), two physical blocks with the physical block addresses 21~22 are the initial operation image 224. Accordingly, as a protection mode (protect mode) of each physical block corresponding to each of the logical block addresses 0, 1, an original protection attribute is initially set.

On the other hand, while original protection attributes of the logical block addresses 2~6 belonging to converted image data of the immediately after start-up image 242 other than the initial operation image 224 are R, RW, RW, RW and RW, respectively (see FIG. 10), for forcibly causing protection attribute violation to start the exception processing at a first access after operation is started, the protection mode of NULL is initially set for all of them.

For more specifically describing the initial (before change) mapping table shown in FIG. 11(*a*), shown in FIG. 12 is an example of contents of the initial operation image 224 (FIG. 8) and the converted image data 290 (FIG. 8) included in the non-volatile storage unit 152. With reference to FIG. 12, the physical block addresses 21 and 22 correspond to the initial operation image 224 as is already described with reference to FIG. 11(*a*), which part is yet to be subjected to data conversion such as compression and encipherment.

In addition, in the example shown in FIG. 12, both physical and logical blocks have 4906 bytes in size. Moreover, the physical block address 23 includes converted data of two logical block addresses. One is data of the logical block address "2" shown in FIG. 11(*a*), which is 700-byte data as a result of data conversion processing. The other is data of the logical block address "4" shown in FIG. 11(*a*), which is 3300-byte data as a result of data conversion processing. The physical block address 24 also includes converted data of two logical block addresses. They are 1000-byte data of the logical block address "3" and 2500-byte data of the logical block address "6".

Between these physical block addresses 23 and 24, there exists a 78-byte free space in which a plurality of blocks are combined so as not to exceed a block size. This is to avoid excess over a block size by putting a plurality of blocks together in succession and at exception event processing, to avoid use of two TLB entries by the read of two physical blocks.

The logical block 5 is not illustrated in FIG. 12, the reason of which is that the logical block 5 is assigned to other blocks than the physical blocks 21~24.

(Detailed Operation of the Computer System 200 (Including Change of the Mapping Table))

In the following, detailed operation of the above-described computer system 200 will be described with reference to FIG. 6 and FIG. 7, and FIG. 10, FIG. 11(*a*) and FIG. 11(*b*).

First, at Step S201 in FIG. 7, the computer system 200 executes initialization of the hardware such as clearing of the above-described main storage unit 151 when started. At this time, since the initial operation image 224 includes data of the initialized mapping table unit 157 and data of the initialized protection information unit 158, the data of the mapping table unit 157 will be automatically set on the computer system 200 as shown in FIG. 11(*a*) and the data of the protection information unit 158 in such a state as shown in FIG. 10 will be set. Moreover, since the initial operation image 224 includes the function of the mapping table change unit 154, the function can be used.

Next, at Step S202 in FIG. 7, the CPU 201 starts the system from the initial operation image 224. More specifically, at the start of operation of the system, the IPL 204 sets a logical address of an instruction to be first executed at a program counter in the CPU 201 to cause execution to be started from the instruction, thereby starting system operation. Lastly, at Step S203 in FIG. 7, the program executed on the CPU 201 accesses the main storage unit 151 to cause the system to operate.

How the system operates is premised on such an access as follows as an example.

(1) First read access to a logical address having the logical block address "2".

(2) Second and the following read accesses to a logical address having the logical block address "2".

(3) After the read access to a logical address having the logical block address "2", a write access to a logical address having the logical block address "4".

(4) A read access to a logical address having the logical block address "1".

In the following, how the computer system 200 operates will be described based on FIG. 6.

(1) First, description will be made of operation executed when a first read access occurs to a logical address having the logical block address "2" (FIG. 10 and FIG. 11(*a*)).

In this case, the address translation unit 156 searches the mapping table unit 157 with the logical block address "2" to obtain an entry "logical block address 2, physical block address 23, protection mode (protect mode) NULL" (Step S100 in FIG. 6).

At this time, since the protection mode is NULL (Yes at Step S101 in FIG. 6), processing of the memory access in question is temporarily held to notify the mapping table change unit 154 of an exception event and start the exception processing (Step S106 in FIG. 6). The mapping table change unit 154 searches the protection information unit 158 with the logical block address "2" to obtain a protection attribute "R" of the protection mode (protect mode) of an entry with the logical block address 2 shown in FIG. 11(*a*) (Step S107 in FIG. 6). Subsequently, read 700-byte data from a relevant block of ROM (the non-volatile storage unit 152) specified by the physical block address "23" corresponding to the logical block address "2" (FIG. 12) to expand the data on RAM and write the 4096-byte data to a free physical block (assumed to be assigned "13") on the main storage 151 (Step S108 in FIG. 6).

Next, the mapping table change unit 154 rewrites the physical block address "23" on the non-volatile storage unit 152 in the entry having the logical block address "2" as shown in FIG. 11(*b*) into the physical block address "13" on the main storage unit (RAM) and rewrite the protection mode from NULL to R (Step S109 in FIG. 6).

Moreover, since the relevant physical block ("23" as of before change and "23" also as of after change) includes data as conversion of a plurality of logical blocks, also as to data of a logical block other than the physical block address "23" as of before change when an exception event occurs, execute expansion, assignment of a physical block, data write and update of the mapping table. More specifically, search the protection information unit for the logical block "4" (Step S107 in FIG. 6) to expand 3300-byte data into 4096-byte data and write the data to a free physical block (assumed to be assigned "14") of the main storage unit 151 (Step S108 in FIG. 6), so that the mapping table change unit 154 rewrites the physical block address "23" on ROM in an entry having the logical block address "4" as shown in FIG. 11(*b*) to the physical address "14" on RAM, thereby rewriting the protection mode (protect mode) from NULL to RW (Step S109 in FIG. 6).

After expansion of all the logical blocks included in the physical block, write to the main storage unit 151 and update of the mapping table unit 157 are completed, notify the address translation unit 156 of the completion of the exception processing (Step S110 in FIG. 6).

Upon receiving the notification of exception processing completion from the mapping table change unit 154, the address translation unit 156 resumes the temporarily held memory access processing from Step S100 in FIG. 6. Then, when searching the mapping table unit 157 with the logical block address "2" to find that the mapping table unit 157 is changed from the state shown in FIG. 11(*a*) to the state shown in FIG. 11(*b*), the address translation unit 156 obtains an entry "logical block address 2, physical block address 13 and protect mode R" this time (Step S100 in FIG. 6).

Subsequently, since a memory access designated by the program has a protect mode R (No at Step S101 in FIG. 6) and is a read access (No at Step S102 in FIG. 6), the address translation unit 156 determines that there is no protection violation to translate a logical address designated by the program to a physical address by using the physical block address "13" on the main storage unit 151 in the obtained entry (Step S104 in FIG. 6), read a relevant part of the main storage unit 151 specified by the physical address by access and return an obtained value to the program (Step S105).

Thus, when a first access occurs to a block whose protection attribute is NULL after system operation is started, data of the block is read from ROM (the non-volatile storage unit 152), expanded and written to RAM (the main storage unit 151) to read the data. Although the description has been here made of read as an example, this is also the case with write access.

(2) Next, description will be made of operation executed when second and following read accesses to a logical address having the logical block address "2" occur.

When searching the mapping table unit 157 with the logical block address "2" to find that the mapping table unit 157 is updated from the state shown in FIG. 11(*a*) to the state shown in FIG. 11(*b*), the address translation unit 156 obtains an entry "logical block address 2, physical block address 13 and protection mode R" in the main storage unit 151 (Step S100 in FIG. 6).

Subsequently, since the memory access designated by the program has the protection mode "R" (No at Step S101 in FIG. 6) and is a read access (No at Step S102 in FIG. 6), the address translation unit 156 translates a logical address designated by the program to a physical address by using the obtained physical block address "13" in RAM (the main storage unit 151) (Step S104 in FIG. 6), and accesses and reads a part of the main storage unit 151 specified by the physical address to return the obtained value to the program (Step S105 in FIG. 6).

Thus, when the second and following accesses occur to a block belonging to the immediately after start-up image 242 other than the initial operation image 224 after system operation is started, since expansion and physical block assignment operation as in the first access is no longer required, data existing on the main storage unit 151 will be immediately updated.

(3) Next, description will be made of operation executed when a write access to a logical address having the logical block address "4" occurs.

The address translation unit 156 searches the mapping table unit 157 with the logical block address "4" designated by the program to obtain an entry with the logical block address "4", the physical block address "14" and the protection mode "RW" in RAM (the main storage 151) as shown in FIG. 11(*b*) (Step S100 in FIG. 6).

Since the protection mode is already changed from "NULL" to "RW" (No at Step S102 in FIG. 6), and the memory access designated by the program is a write access (Yes at Step S102) and the protection mode is "RW" (Yes at Step S103 in FIG. 6), the address translation unit 156 translates a logical address designated by the program to a physical address by using the physical block address "14" in the obtained entry (Step S104 in FIG. 6) and accesses a part of the main storage unit 151 specified by the physical address to write data transferred from the program (Step S105 in FIG. 6).

Thus, since already at the time of exception processing of the logical block address "2", expansion processing of the logical block address "4" is executed, even at first occurrence of an access to the logical block address "4", no exception event occurs to execute a memory access. This is also the case with data of other logical blocks included in the logical block which has already generated an exception event, that is, read and expansion processing with respect to a certain physical block including converted data is executed only once.

(4) Lastly, description will be made of operation executed when a read access to a logical address having the logical block address "1" occurs.

The address translation unit 156 searches the mapping table unit 157 with the logical block address "1" designated by the program to obtain an entry with the logical block address "1", the physical block address "22" and the protection mode "R" shown in FIG. 11 (*b*) (Step S100 in FIG. 6).

Since the protection mode of the entry is "R" not "NULL" (No at Step S101 in FIG. 6) and a memory access designated by the program is a read access (No at Step S102 in FIG. 6), the address translation unit 156 translates a logical address designated by the program into a physical address by using the physical block address "22" in the obtained entry (Step S104 in FIG. 6) and accesses a part of the main storage unit 151 specified by the physical address to return the read data to the program (Step S105 in FIG. 6).

Thus, there occurs no exception event in a read access designated by the program to a block of the initial operation image 224.

As described in the foregoing, the above-described first exemplary embodiment attains the effects that read from a certain physical block occurs only once and that at the expansion, it is unnecessary to read two or more physical blocks. Moreover, in the first exemplary embodiment, the immediately after start-up image 242 is converted into data and held in the non-volatile storage unit 152, which method can be used for other purposes than reduction in a starting time. It is possible to use the method, for example, in a case of holding a file system compressed or enciphered in the non-volatile storage unit 152.

Second Exemplary Embodiment

Figure 13:
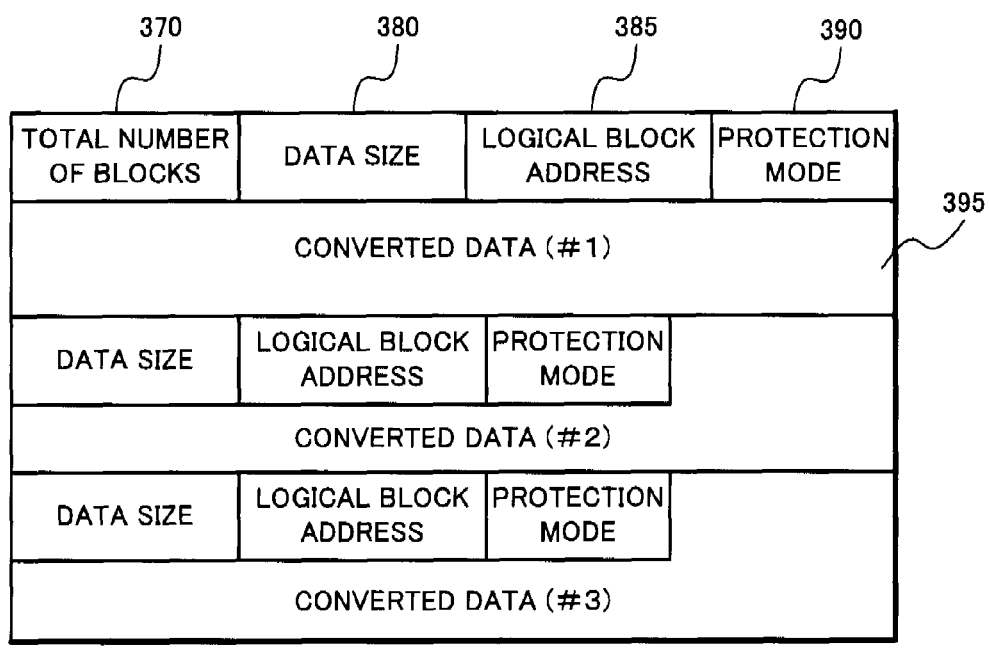
FIG. 13 is a diagram for use in explaining an example of arrangement of each physical block of converted image data according to a second exemplary embodiment of the present invention.

Although in the above-described first exemplary embodiment, the protection information unit 158 is used at the update of the mapping table 157, when converted data holds an original protect mode (protection mode) of each logical block as shown in FIG. 13, it is not necessary to refer to the protection information unit 158 shown in FIG. 1.

In this case, a computer system according to the second exemplary embodiment is structured as follows. That is, the system comprises the non-volatile storage unit 152 for storing a program, the main storage unit 151 for receiving said program from the non-volatile storage unit 152, and the data processor 102 including a memory management unit (OS) which manages the program stored in the non-volatile storage unit 152 and the main storage unit 151. Of these, the above-described memory management unit comprises an address translation unit operable upon a memory access from the program to translate a logical block address to a physical block address, a mapping table unit for holding information of the address translation unit and a mapping table change unit for updating an entry of said mapping table unit at the occurrence of an exception. Then, the above-described mapping table unit holds an original protect mode (protection mode) of each logical block in said converted data.

Thus, while in the above-described first exemplary embodiment, the protection information unit 158 is used at the update of the mapping table 157, in the present second exemplary embodiment, when converted data holds an original protect mode (protection mode) of each logical block as shown in FIG. 13, it is not necessary to refer to the protection information unit 158.

Figure 14:
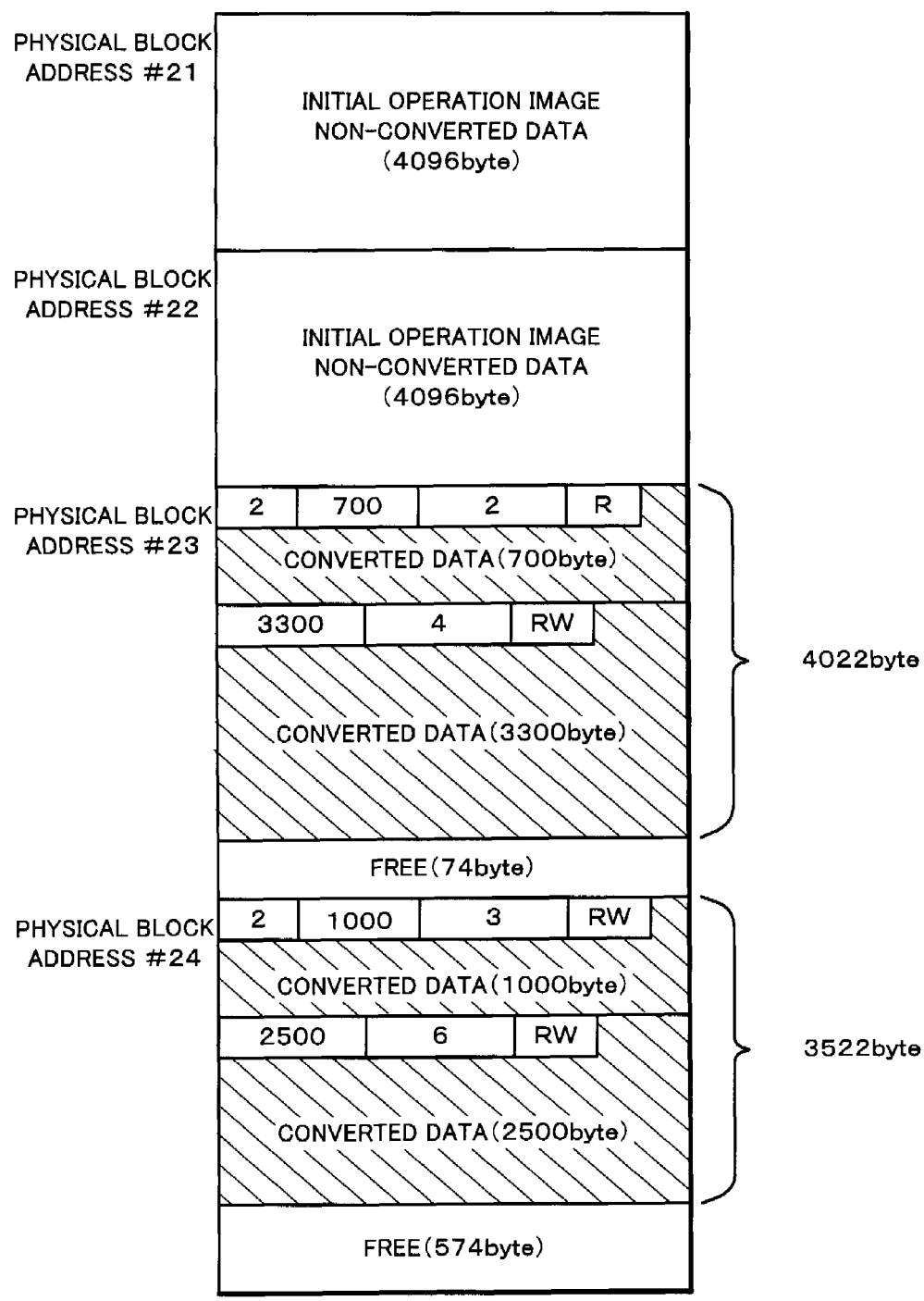
FIG. 14 is a diagram for use in explaining an example of arrangement of converted data according to the second exemplary embodiment.

More specifically, in the present second exemplary embodiment, the protection mode (protect mode) 163 of the above-described mapping table 157 is updated with reference to a protection mode (protect mode) 390 shown in FIG. 13. In this case accordingly, the protection information unit 158 is omitted from the computer system 100 shown in FIG. 1 and Step S107 executed at the time of exception event processing shown in FIG. 6 is omitted. The converted data part in the example shown in FIG. 13 will include a protection information attribute (protection mode attribute) (FIG. 14) to enable data processing efficiency to be increased and speed up the system.

Also in the second exemplary embodiment, similarly to the case of the above-described first exemplary embodiment, read from a certain physical block occurs only once and at the expansion, it is unnecessary to read from two or more physical blocks. At this time, unlike the above-described first exemplary embodiment, because the protection mode 163 of the mapping table 157 is updated based on information of a protect mode preserved in converted data, the protection information unit 158 is not required.

In the above-described computer system here, a logical address, a total number of logical addresses, a program data size and a protection mode corresponding to a physical address of the main storage unit 151 may be entered in each of a plurality of programs stored in a physical address of a predetermined size of the non-volatile storage unit 152.

Third Exemplary Embodiment

In the above-described first exemplary embodiment, because the size obtained as a result of data conversion from each logical block is smaller than the size of a physical block (4096 bytes in the case of FIG. 14), a plurality of logical blocks can be stored in one physical block.

Figure 15:
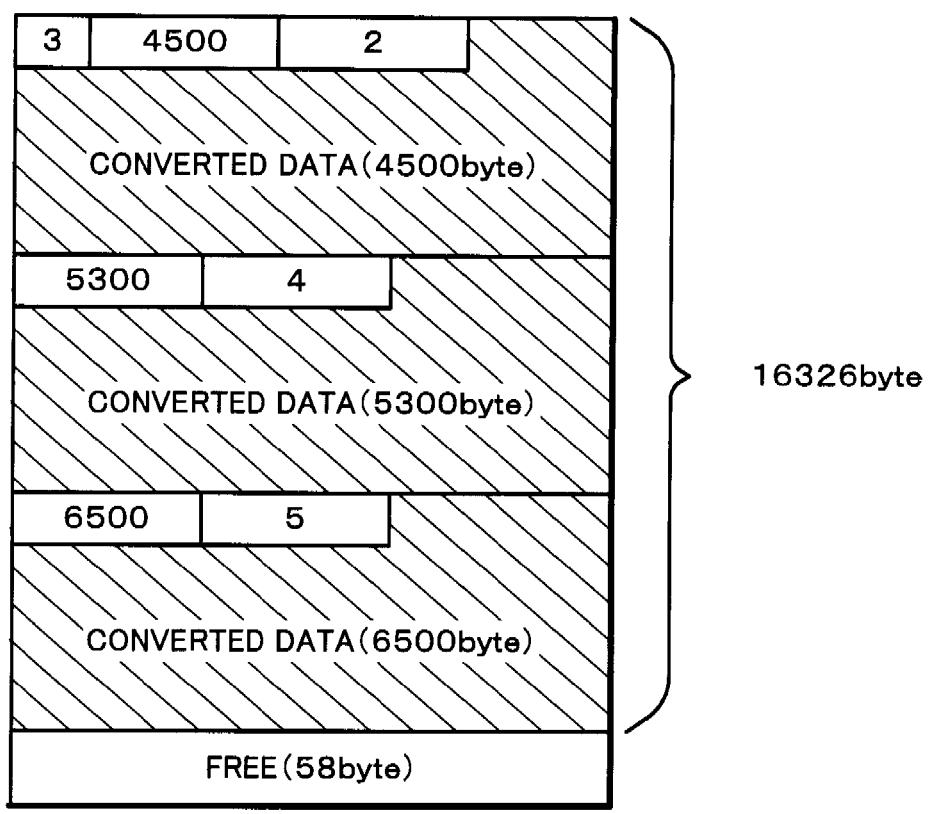
FIG. 15 is a diagram for use in explaining an example of arrangement of non-converted data and converted data of a non-volatile storage unit according to a third exemplary embodiment.

The third exemplary embodiment copes with a case where a size obtained as a result of data conversion becomes larger than 4096 bytes as an original size. In this case, a size of a plurality of logical blocks put together is assumed to be an arbitrary integral multiple of an original physical block size as shown in FIG. 15. In the example of FIG. 15, the size is 16384 bytes (four times the original size).

Therefore, when a first access occurs to a relevant block to call up an exception event, data of four blocks is read starting with a physical block address indicated in the mapping table and expanded to three logical blocks (reversely converting data subjected to conversion processing enables the data to be restored to original data, which reverse conversion processing will be referred to "expansion").

Also when converting and putting together data of each logical block of the immediately after start-up image 242, an appropriate block size is selected to put data together while considering a data size as of after conversion. At this time, start generation of a subsequent block so as not to bridge over a boundary of a determined block size (16338 bytes). In the example of FIG. 15, there exists a free region of 58 bytes with no data. Here, a physical block size for putting logical blocks together is not necessarily a fixed size for one system. In other words, a size of blocks combined needs to be an arbitrary integral multiple of a physical block size and may be varied according to a physical block such as twice, triple, four times, five times and the like.

The third exemplary embodiment, even when a data size becomes larger than an original physical block size by data conversion, attains the effect that read from a certain physical block occurs only once similarly to the above-described first exemplary embodiment.

Fourth Exemplary Embodiment

A computer system according to the fourth exemplary embodiment is characterized in further subjecting said program subjected to predetermined data conversion which is stored in the above-described non-volatile storage unit to predetermined data conversion whose contents are different at fixed time intervals.

More specifically, in the above-described third exemplary embodiment, after expansion of converted data, the data is continuously used. On the other hand, in the fourth exemplary embodiment, again subject data expanded on the main storage unit 151 to data conversion processing. In a case, for example, where data on the main storage unit 151 is to be enciphered and held, re-encipher the data at fixed time intervals.

Figure 16:
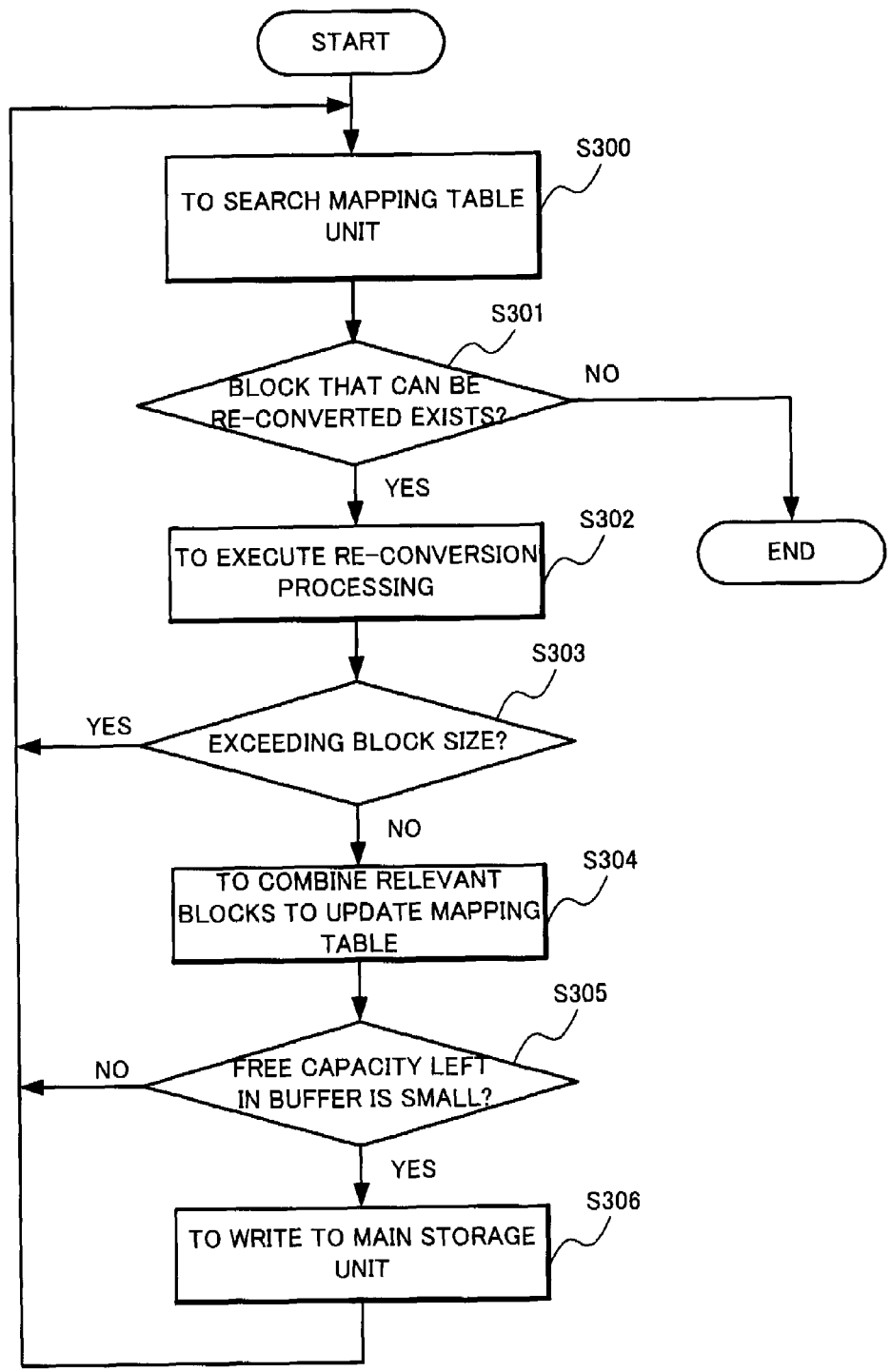
FIG. 16 is a flow chart showing an example of re-conversion processing according to a fourth exemplary embodiment.

FIG. 16 shows a flow chart of re-conversion processing in the fourth exemplary embodiment. In this case, as actual operation, first search the mapping table unit to search an entry of a block which can be re-converted (Step S300). When there exists no block which can be re-converted (No at Step S301), processing ends.

On the other hand, when there exists a block which can be re-converted (Yes at Step S301), re-convert the logical block and store the same in a buffer (not shown) (Step S302). Then, when the block together with converted data which is already in the buffer exceeds the block size (Yes at Step S303), abandon the re-converted data of the relevant block and find a subsequent entry. On the other hand, when the block together with converted data which is already in the buffer fails to exceed the block size (No at Step S303), update the mapping table of the relevant block (Step S304).

When a free capacity left in the above-described buffer is reduced (Yes at Step S305), write data to a free region of the main storage unit 151 (Step S306). At this time, it is possible to overwrite data on a physical block of any block stored in the buffer. Although the algorithm for determining write from the above-described buffer is premised on when a free capacity of the buffer is reduced in the present fourth exemplary embodiment, existing arbitrary algorithm can be used.

Figure 18:
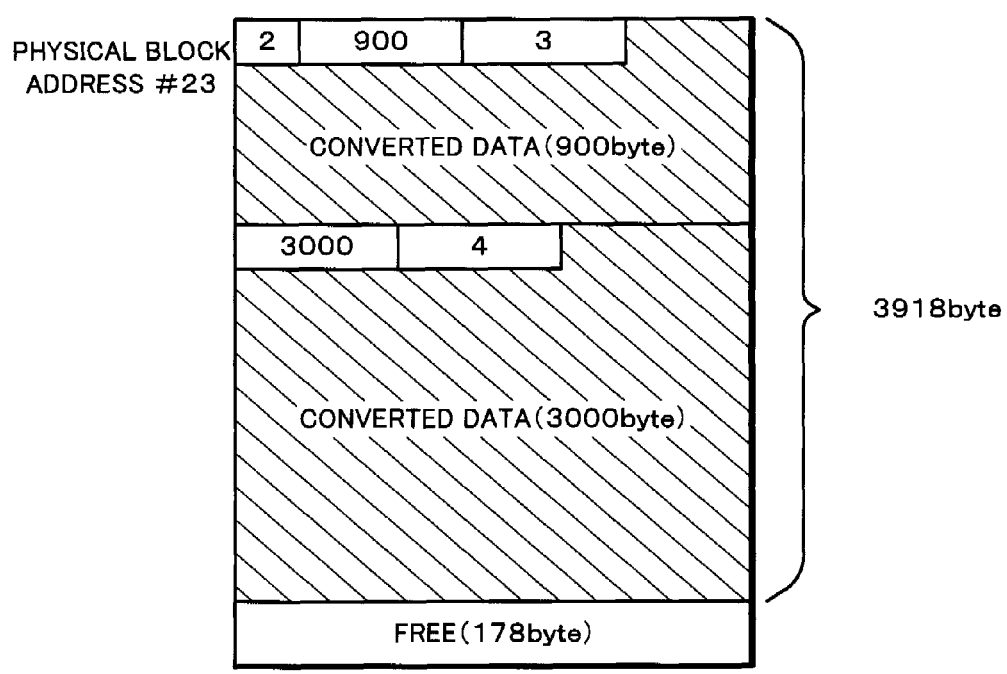
FIG. 18 is a diagram for use in explaining an example of arrangement of converted data as of after re-conversion processing according to the fourth exemplary embodiment.

Next, change of the mapping table in the fourth exemplary embodiment will be described with respect to one example. FIG. 17(a) shows a state of the mapping table at initialization (before change) which is held in the computer 200. Now assume that data with the logical block address 3 is subjected to re-conversion processing to store converted data of 900 bytes in the buffer as shown in FIG. 18.

Next, subject data of the logical block address 4 to re-conversion processing and store the obtained data in the buffer. As a result, the data is turned into 3900-byte converted data, so that a series of management data, the total number of blocks 2, the data size 900 and the logical block address 3, and the data size 3000 and the logical block address 4 as shown in FIG. 18 is written on the main storage unit 151.

At this time, since data is to be written to the physical block address 15 on the main storage unit 151 used by the logical block address, change the physical block addresses of the logical block addresses 3 and 4 to 15 and change the protection mode (protect mode) to NULL as shown in FIG. 17(b).

Thus, according to the above-described fourth exemplary embodiment, since data conversion processing is executed at fixed time intervals, no data will be continuously expanded as it is on the main storage unit 151, so that safety when data is secretly glanced or the like can be enhanced.

(Memory Management Method of Computer System in the Present Exemplary Embodiment)

Next, a memory management method of a computer system according to the present exemplary embodiment will be described with reference to the accompanying drawings.

The memory management method of the computer system structured to transfer a program stored in the non-volatile storage unit 152 to the main storage unit 151 according to the present exemplary embodiment comprises a first step of storing said program subjected to predetermined data conversion and said program yet to be subjected to predetermined data conversion in the non-volatile storage unit 152, a second step, operable upon a memory access of OS and an application after the start-up of the computer system, of transferring a program subjected to predetermined data conversion among the programs stored in the above-described non-volatile storage unit 152 to the main storage unit 151 and executing reverse conversion to the predetermined data conversion, a third step of changing a physical address of a program stored in the non-volatile storage unit 152 to a physical address of the main storage unit 151, and a fourth step of assigning a capacity of a plurality of logical blocks for expanding data in a block including one physical address of a predetermined capacity which is assigned to said program stored in the above-described non-volatile storage unit 152.

Such arrangement as described above enables a memory management method of a computer system to be provided which produces equivalent effects to those of the above-described first exemplary embodiment, as well as attaining the effect that the invention related to the above-described computer system can be executed efficiently and reliably by the above-described procedure.

Here, in the present exemplary embodiment, between the above-described first step and second step, a step may be provided of uniformly setting the protection mode NULL to a program subjected to predetermined data conversion which is stored in the above-described non-volatile storage unit 152.

In addition, the memory management method of the computer system may comprise, in line with the above-described first step, a step of entering, in each of a plurality of programs stored in a physical address of a predetermined size of the above-described non-volatile storage unit 152, a logical address, a total number of logical addresses and a program data size corresponding to a physical address of said main storage unit 151.

Moreover, according to the present exemplary embodiment, the memory management method of the computer system may comprise, in line with the above-described first step, a step of entering, in each of a plurality of programs stored in a physical address of a predetermined size of the above-described non-volatile storage unit 152, a logical address, a total number of logical addresses, a program data size and a protection mode (protect mode) corresponding to a physical address of said main storage unit 151. It is also possible to provide, in line with the above-described first step, a step of subjecting a program subjected to predetermined data conversion among programs stored in the above-described non-volatile storage unit 152 to predetermined conversion of other contents at fixed time intervals.

Specific contents of the above-described memory management method of the computer system have been detailed in the above-described first to fourth exemplary embodiments.

(The Memory Management Program of the Computer System in the Present Exemplary Embodiment)

Next, a memory management program of a computer system according to the present exemplary embodiment will be described with reference to the accompanying drawings.

The memory management program of a computer system according to the present exemplary embodiment is a program for causing a computer which controls operation of a computer system structured to transfer a program stored in the non-volatile storage unit 152 to the main storage unit 151 to execute a procedure of storing a program subjected to predetermined data conversion and a program yet to be subjected to predetermined data conversion in the above-described non-volatile storage unit 152, a procedure, operable upon a memory access of OS and an application after the start-up of the computer system, of transferring a program subjected to predetermined data conversion among the programs stored in the above-described non-volatile storage unit 152 to the main storage unit 151 and executing reverse conversion to the predetermined data conversion, a procedure of changing a physical address of a program stored in said non-volatile storage unit 152 to a physical address of the main storage unit 151, and a procedure of assigning a capacity of a plurality of logical addresses for expanding data in a block including one physical address of a predetermined capacity which is assigned to a program stored in said non-volatile storage unit 152. Such arrangement as described in the foregoing enables a memory management program of a computer system to be provided which produces equivalent effects to those of the above-described first exemplary embodiment.

Here, in the present exemplary embodiment, a procedure of uniformly setting the protection mode NULL at a program subjected to predetermined data conversion which is stored in the above-described non-volatile storage unit 152 may be incorporated in the above-described memory management program of the computer system to enable said computer to execute.

In addition, in the present exemplary embodiment, incorporated into the above-described memory management program of the computer system to enable said computer to execute may be a procedure of entering, in each of a plurality of programs stored in a physical address of a predetermined size of the above-described non-volatile storage unit 152, a logical address, a total number of logical addresses and a program data size, or these and a protection mode corresponding to a physical address of the main storage unit 151.

Moreover, according to the present exemplary embodiment, a procedure of subjecting a program subjected to predetermined data conversion among programs stored in the above-described non-volatile storage unit 152 to predetermined conversion of other contents at fixed time intervals may be incorporated into the above-described memory management program of a computer system to enable said computer to execute.

As to specific contents of the above-described memory management program of the computer system, equivalent contents have been detailed in the above-described first to fourth exemplary embodiments with respect to operation and functions of the memory management system of the computer.

As described in the foregoing, since the present invention is structured to expand data of all the blocks included in a block subjected to data conversion once at the time of expansion of any block, one block of a non-volatile storage unit such as ROM can be read only once. This enables the shortcoming (read can occur twice or more to increase a starting time) involved in related examples (background art) to be reliably and efficiently improved. Also according to the present invention, when expanding data of a non-volatile storage medium onto a main storage unit, it is unnecessary to read a plurality of blocks of the non-volatile storage medium, and only one TLB entry is used. The reason is that none of converted data of the non-volatile storage medium is preserved bridging over a plurality of blocks.

Therefore, since the non-volatile storage unit is capable of storing image data converted from a part of a main storage image as of after initialization processing of the OS and an application program on a block basis, the exemplary embodiment of the present invention enables converted data of each block to be appropriately put together without exceeding a block size. With this arrangement, since at the start-up of the computer system, the system is started from a main storage image part which is yet to be subjected to data conversion, the system is brought to the same state as that immediately after start-up of the OS and the application program to return to an environment as of immediately after the start-up. At this time, the system is started up from a part of the main storage image to cause no operation interruption before the system goes operable, thereby effectively reducing a starting time.

Since the computer system according to the exemplary embodiment of the present invention thus structured to function as described above enables converted data of each block to be appropriately put together without exceeding a block size, at the start-up of the computer system, the system is started from a main storage image part which is yet to be subjected to data conversion to enter the same state as that as of immediately after start-up of the OS and the application program, so that the system returns to an environment as of immediately after the start-up. Then, because the system is started up from a main storage image part, no operation interruption is caused before the system goes operable, resulting in effectively reducing a starting time.

Moreover, since after start-up of the computer system, at a first access to a block subjected to data conversion, all the computed data included in the block is expanded, access to the block occurs only once, which enables a shortcoming to be completely eliminated that an access on a block basis might read a plurality of blocks of the non-volatile storage unit in some cases, the shortcoming which related examples have. Then, in this case, since the block in question fails to exceed the block size, even from a non-volatile storage unit that can be read only by a block size, more than one block needs not to be read at the time of reading the block.

As described in the foregoing, since according to the exemplary embodiment of the present invention, at a first access to a logical block whose data is yet to be expanded, all the logical blocks included in a physical block in which the block in question is stored are expanded at once (to return data to original data by reversely converting data subjected to data conversion), access to the physical block occurs only once, which enables efficient memory management to effectively reduce a start-up time of the computer system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-104932, filed on Mar. 31, 2005, the disclosure of which is incorporated herein in its entirety by reference.

INDUSTRIAL APPLICABILITY

The present invention is applicable for use in storing data subjected to conversion processing such as compression or encipherment and dynamically expanding the same on a non-volatile storage medium. This enables a required capacity of a non-volatile storage medium to be reduced and highly confidential contents to be stored in a non-volatile storage medium and to be used.

The invention claimed is:

1. A computer system, having a non-volatile storage unit, a main storage unit, and a data processor including a memory management unit for transferring a program stored in the non-volatile storage unit to the main storage unit, and managing the program stored in said non-volatile storage unit and said main storage unit, wherein said memory management unit comprises:

a program storage control function, executed by the data processor, for storing one part data subjected to predetermined data conversion of a main storage image as of after initialization processing of said program, which is used to execute said program after start-up, and the other part data not yet subjected to predetermined data conversion of the main storage image as of after initialization processing of said program, which is used to start the computer system by logical block basis in said non-volatile storage unit; and a function, executed by the data processor, for combining a plurality of logical blocks of said one part data subjected to predetermined data conversion of the main storage image as of after initialization processing of said program so said combined plurality of said logical blocks do not exceed a block size of one physical block of said non-volatile storage unit to store the corresponding said plurality of logical block when said one part data subjected to predetermined data conversion of the main storage image as of after initialization processing of said program is stored in said non-volatile storage unit, wherein if the combined plurality of said logical blocks exceed the block size of one physical block of said non-volatile storage unit, the function abandons the combined plurality of said logical blocks and searches for a subsequent entry of a block that can be combined so that combined plurality of logical blocks do not exceed the block size, and a function, executed by the data processor, for expanding all data of the logical blocks of said one part data subjected to predetermined data conversion of the main storage image as of after initialization processing of said program one time at a first access to a logical block of said one part data subjected to predetermined data conversion of the main storage image as of after initialization processing of said program.

2. The computer system according to claim 1, wherein a protection mode NULL is uniformly set to said program which is stored in said non-volatile storage unit and subjected to predetermined data conversation, and a physical address on said main storage unit is assigned to said one part data subjected to predetermined data conversion of said program which is stored in said non-volatile storage unit.

3. The computer system according to claim 1, wherein said program subjected to predetermined data conversion which is stored in said non-volatile storage unit is again subjected to predetermined data conversion whose contents are different at fixed time intervals.

* * * * *